May 7, 1935. E. J. ZELT 2,000,732

THREADED CONNECTION

Filed Feb. 1, 1934

Inventor:
Elmer J. Zelt,
by Harry E. Dunham
His Attorney

Patented May 7, 1935

2,000,732

UNITED STATES PATENT OFFICE 2,000,732

THREADED CONNECTION

Elmer J. Zelt, Fort Wayne, Ind., assignor to General Electric Company, a corporation of New York Application February 1, 1934, Serial No. 709,310

1 Claim. (Cl. 85—36)

My invention relates to insulating bushings. It is frequently desirable to secure a bushing through an opening in a thin wall of a casing such as is commonly used for a transformer. A threaded connection between the bushing and casing wall is a convenient arrangement because it permits them to be quickly and easily assembled and it is simple and inexpensive. However, it is not very practicable to form a helical thread on the edge of the wall around the opening if the wall is rather thin. The general object of the invention is to provide an improved form of bushing and electrical apparatus casing assembly.

Figure 1:
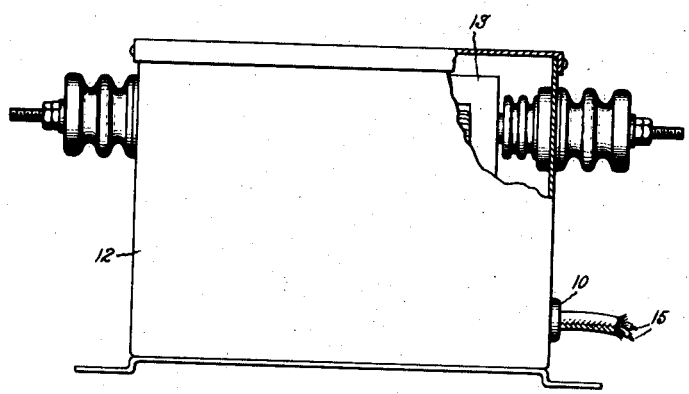
Figure 2:
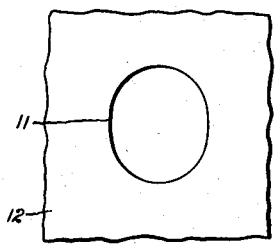
Figure 3:
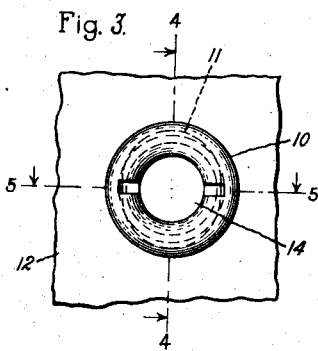
Figure 4:
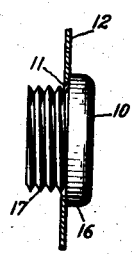
Figure 5:
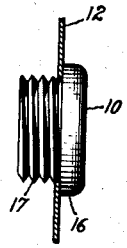

The invention will be more fully explained in the following description taken in connection with the accompanying drawing in which Fig 1 shows a transformer in a thin sheet metal casing with a small bushing secured in an opening in the casing in accordance with the invention; Fig. 2 is an enlarged view of a small section of the casing with the opening for the bushing; Fig. 3 is an enlarged view of the bushing held in the opening; Fig. 4 is a sectional view on the line 4—4 of Fig. 3; and Fig. 5 is a sectional view on the line 5—5 of Fig. 3.

Like reference characters indicate similar parts in the different figures of the drawing.

The invention will be explained in connection with a bushing 10 secured in an opening 11 in a casing 12 of a transformer 13 as shown in the drawing. The bushing 10 has an opening 14 for the transformer leads 15 which are protected by the bushing from the thin edge of the opening 11 in the casing.

The outer end of the bushing 10 is formed with an external flange 16 and external helical threads 17 are formed from this flange to the inner end of the bushing. The threaded part of the bushing 10 is turned into the opening 11 and held securely in place with its flange 16 against the outer surface of the casing 12. This cannot be done, however, if the opening 11 is round or circular because the helical threads 17 could not be made to enter a round opening if their diameter were at all greater than that of the opening and they would not be held in place if their diameter were at all smaller than that of the opening. The invention overcomes this difficulty by making the opening 11 approximately elliptical with its minor diameter somewhat shorter than that of the threads 17 and its major diameter somewhat longer than that of the threads 17 as indicated clearly in Figs. 3, 4 and 5. The edge of the sheet around the opening 11, at least those portions at the ends of its minor diameter where they are engaged by the threads 17, is thinner than the pitch of the threads so as to enter the space between two threads as indicated in Fig. 5. Preferably the whole sheet in which the opening 11 is formed is thinner than the pitch of the threads 17 so that all that is necessary to form the opening is to punch it out with a simple punch of suitable cross section. As the threads 17 are turned into the opening 11, they engage the edge of the sheet at the opposite ends of the minor diameter of the opening as indicated in Fig. 5 but are free to pass through the opening at opposite ends of the major diameter of the opening as indicated in Fig. 4. While an approximately elliptical shaped opening 11 is considered preferable, other forms of opening may be used if desired so long as its minor diameter is smaller than that of the threads 17 and its major diameter is greater than that of the threads 17.

The invention has been explained by describing and illustrating a particular form of bushing held in an opening in a transformer casing but it will be apparent that other forms and applications of the invention may be made without departing from the spirit of the invention and the scope of the appended claim.

What I claim as new and desire to secure by Letters Patent of the United States is:

The combination with a wall of an electrical apparatus casing, of a bushing having an externally helically threaded portion and an external flange, said wall having an opening to receive said bushing, the edge of the wall around said opening being in the plane of the wall and having a minor diameter smaller than that of the threads and a major diameter greater than that of the threads, and said wall being thinner than the pitch of the threads.

ELMER J. ZELT.